United States Patent
Keller

(10) Patent No.: US 11,773,897 B1
(45) Date of Patent: Oct. 3, 2023

(54) BALL JOINT

(71) Applicant: Super ATV, LLC, Madison, IN (US)

(72) Inventor: Todd Keller, Maywood, MO (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 18/159,690

(22) Filed: Jan. 26, 2023

(51) Int. Cl.
*F16C 11/06* (2006.01)

(52) U.S. Cl.
CPC ...... *F16C 11/0647* (2013.01); *F16C 11/0642* (2013.01); *B60G 2204/416* (2013.01); *F16C 2326/05* (2013.01)

(58) Field of Classification Search
CPC .............. B60G 7/005; B60G 2204/416; F16C 11/0619; F16C 11/06232; F16C 11/0642; F16C 11/0647; F16C 11/0685; F16C 11/069; F16C 11/0695; F16C 2326/05; Y10T 403/32204; Y10T 403/32213; Y10T 403/32786; Y10T 403/32795; Y10T 403/32803
USPC .............................. 403/76, 77, 141, 142, 143
See application file for complete search history.

(56) References Cited

U.S. PATENT DOCUMENTS

| | | | | |
|---|---|---|---|---|
| 753,329 A * | 3/1904 | Tate ...................... | F16B 37/14 | 403/76 |
| 2,757,029 A * | 7/1956 | Latzen ................. | F16C 11/0647 | 403/140 |
| 3,401,962 A * | 9/1968 | Scheublein, Jr. ... | F16C 11/0647 | 403/126 |
| 3,524,664 A * | 8/1970 | Scheublein, Jr. ... | F16C 11/0647 | 403/140 |
| 5,564,853 A * | 10/1996 | Maughan ............ | F16C 11/0647 | 403/135 |
| 5,839,845 A * | 11/1998 | Kincaid .............. | F16C 11/0647 | 403/135 |
| 6,007,079 A * | 12/1999 | Kincaid ................ | B60G 7/005 | 403/133 |
| 6,644,671 B1 * | 11/2003 | Maughan ............ | F16C 11/0642 | 464/175 |
| 8,051,615 B2 * | 11/2011 | Mathews .............. | F16G 11/106 | 403/78 |
| 10,308,089 B2 * | 6/2019 | Elterman ............ | F16C 11/0647 | |
| 10,330,143 B2 * | 6/2019 | Kraatz ................ | F16C 11/0642 | |
| 2021/0324906 A1 * | 10/2021 | Heit .................... | F16C 11/0647 | |

FOREIGN PATENT DOCUMENTS

| | | | | |
|---|---|---|---|---|
| DE | 660304 C | * | 5/1938 | .......... F16C 11/0647 |
| FR | 2478757 A1 | * | 9/1981 | .......... F16C 11/0647 |
| JP | 58221012 A | * | 12/1983 | ............ F16C 11/069 |

* cited by examiner

*Primary Examiner* — Josh Skroupa
(74) *Attorney, Agent, or Firm* — Woodard, Emhardt, Henry, Reeves & Wagner, LLP

(57) ABSTRACT

A ball joint assembly includes a stud member connectable to a first vehicle suspension component and a cup member connectable to a second vehicle suspension component. The stud member includes a shaft portion defining a longitudinal axis, and a ball portion extending longitudinally from one end of the stud. The cup member is a two-piece cup comprising a cup base and a cup cap, with the two pieces being connected to hold the stud ball therebetween. The cup base has castle teeth, and the cup cap may have holes for set screws that interlock with the castle teeth to allow adjustment of the tightness of the ball and cup and to lock the ball into position in the cup.

10 Claims, 15 Drawing Sheets

BALL JOINT

BACKGROUND

Ball joints are commonly used in motor vehicle suspensions and are spherical bearings that connect the control arms to the steering knuckles. They are used on virtually every wheeled vehicle, but for vehicles subject to heavy-duty off-road use, the ball joints, and particularly the upper ball joints, face extreme wear conditions. Accordingly, the stock parts historically provided by even the high-end all-terrain vehicle (ATV) and utility task vehicle (UTV) manufacturers are not durable enough for extreme racing enthusiasts.

Disclosed is a heavy-duty ball joint that provides superior durability and performance in extreme off-road racing environments.

SUMMARY

A ball joint assembly may include a stud member connectable to a first vehicle suspension component including a shaft portion defining a longitudinal axis, and a ball portion extending longitudinally from one end of the stud. The ball joint assembly may also include a cup member connectable to a second vehicle suspension component to cooperate with the stud member to allow the stud ball to rotate within the cup without translation. The cup member also may include a cup base and a cup cap, wherein the cup base includes upwardly-extending castle teeth and a first spherical surface and interior threads, and the cup cap includes a second spherical surface and exterior threads to mate with the interior threads of the cup base. The first and second spherical surfaces cooperate to hold the stud ball therebetween when the cup cap is threaded into the cup base. The ball joint assembly may also include one or more threaded fasteners to interlock with the castle teeth to prevent the cup cap from unthreading from the cup base, and thus to lock the ball into position in the cup.

DETAILED DESCRIPTION

Figure 1A:
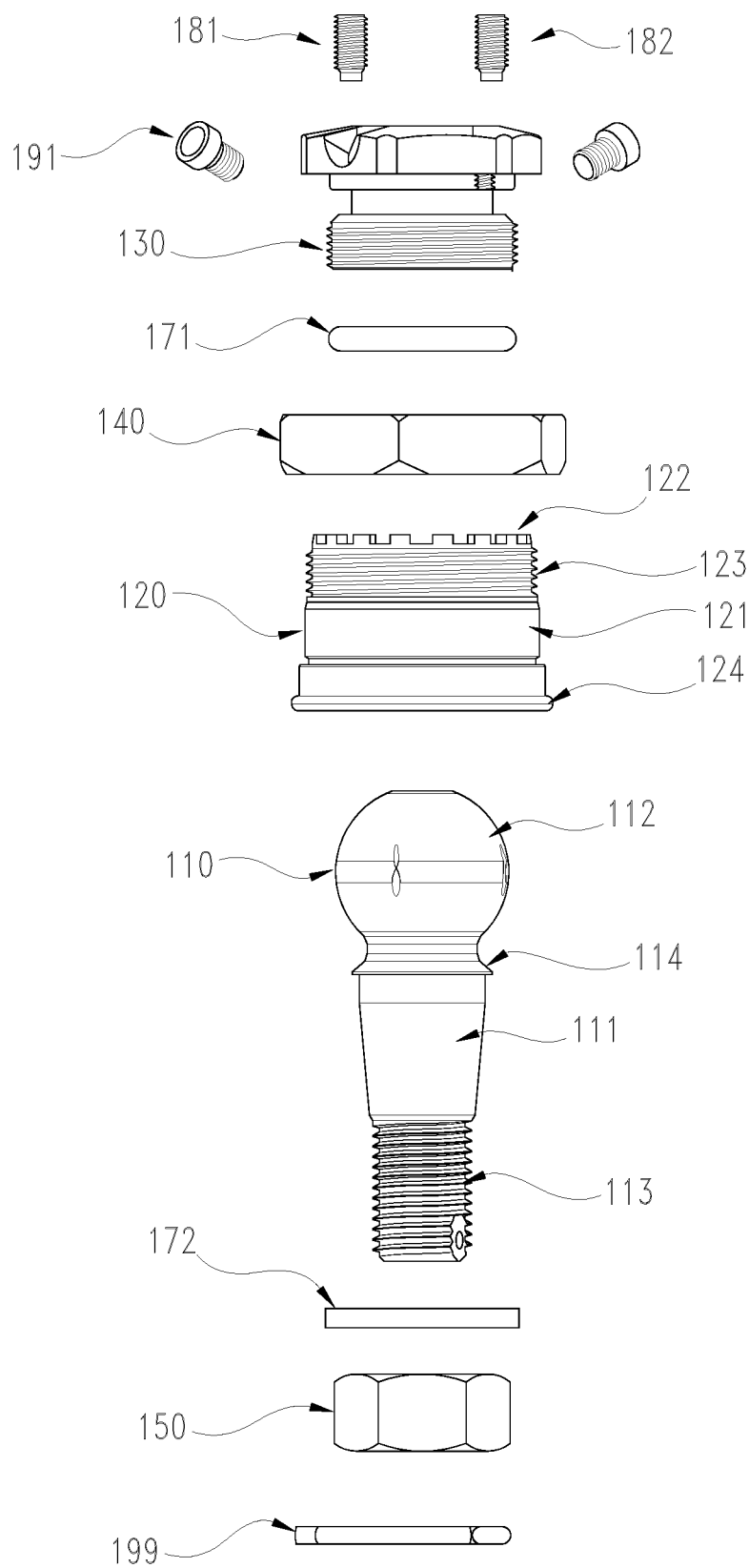
FIGS. 1A and 1B are exploded perspective views of one embodiment of the ball joint assembly of the present invention.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, the ball joint assembly may comprise:
a) a stud member connectable to a first vehicle suspension component and comprising: i) a shaft portion defining a longitudinal axis, and ii) a ball portion extending longitudinally from one end of the stud;
b) a cup member connectable to a second vehicle suspension component and adapted to cooperate with the stud member to allow the stud ball to rotate within the cup without translation, the cup member including a cup base and a cup cap,
wherein the cup base includes a first spherical surface and interior threads, and the cup cap includes a second spherical surface and exterior threads adapted to mate with the interior threads of the cup base, with the first and second spherical surfaces being adapted to cooperate to hold the stud ball therebetween when the cup cap is threaded into the cup base;
wherein the cup base includes upwardly-extending castle teeth;
c) one or more threaded fasteners adapted to interlock with the castle teeth to prevent the cup cap from unthreading from the cup base, and thus to lock the ball into position in the cup.

The cup cap of the assembly may include threaded holes adapted to receive the set screws and thus to facilitate using the set screws to interlock with the castle teeth. This prevents the cup cap from "unscrewing" from the cup base, and allows the tightness of the ball and cup to be adjusted properly and locked into position. Then, if wear caused the connection to become loose, the tightness of the ball in the cup may be adjusted, and locked into a new position.

The assembly may include a first nut, and the cup base may include a lip adapted to cooperate with the first nut to hold a vehicle suspension component therebetween.

The assembly may include a second nut, and the stud member may include a lip adapted to cooperate with the second nut to hold a vehicle suspension component therebetween.

The cup base may include a set of interior threads, and the cup cap may include a set of exterior threads adapted to cooperate with the interior threads of the cup base to hold those two pieces together.

The cup base may include a set of exterior threads adapted to cooperate with the first nut to allow the assembly to be attached to a vehicle suspension component.

The assembly may include a boot adapted to substantially cover and protect the assembly.

In operation, the stud is positioned in the cup base so that the stud shank extends through and from the bottom of the cup base. The exposed portion of the stud shank is connectible to a first vehicle suspension component, such as a spindle or a portal box. The lower portion of the stud ball is held by the spherical surface of the cup base. When the cup cap is screwed into the cup base, the upper portion of the stud ball is held by the spherical surface of the cup cap. The cup cap is tightened until the stud ball is held securely, but is free to move as necessary for proper functioning of the joint. When the two portions of the cup are fastened together, they form a "socket" for holding the stud ball. Fasteners such as set screws are inserted through threaded holes in the cup cap, and are used to interlock with castle teeth on the cup base to prevent the cup cap from loosening. The cup is attached to a second suspension component, such as a vehicle A-arm. Thus, the joint facilitates connection of the two suspension components.

As the joint is used over time under harsh conditions, the surfaces of the ball and the cup may wear, causing the ball to become looser in the cup. If this happens, it may be desirable to tighten the cup cap slightly so that the ball may again be held in its proper position with the appropriate tightness. To do that, the set screws are loosened so that the sup cap may be tightened in the cup base, and the cup cap is tightened as necessary. After tightening the cup cap, the set screws are re-tightened, and the joint is re-installed. The interaction between the set screws and the castle teeth prevents the cup cap from loosening from the cup base unless the set screws are loosened.

It can be seen from the above that one aspect of the present invention provides a ball joint assembly, comprising:

a) a stud member connectable to a first vehicle suspension component and comprising: i) a shaft portion defining a longitudinal axis, and ii) a ball portion extending longitudinally from one end of the stud;

b) a cup member connectable to a second vehicle suspension component and adapted to cooperate with the stud member to allow the stud ball to rotate within the cup without translation, the cup member including a cup base and a cup cap, wherein the cup base includes a first spherical surface and interior threads, and wherein the cup cap includes a second spherical surface and exterior threads adapted to mate with the interior threads of the cup base, with the first and second spherical surfaces being adapted to cooperate to hold the stud ball therebetween when the cup cap is threaded into the cup base;

c) a locking assembly adapted to connect with the cup base and with the cup cap to prevent the cup cap from unthreading from the cup base, and thus to hold the stud ball in the cup without translation.

In a further aspect of the invention there is provided a method of maintaining a ball joint on a vehicle. The method may comprise:

a) providing a ball joint comprising:
i) a stud member connectable to a first vehicle suspension component and comprising: a) a shaft portion defining a longitudinal axis, and b) a ball portion extending longitudinally from one end of the stud;
ii) a cup member connectable to a second vehicle suspension component and adapted to cooperate with the stud member to allow the stud ball to rotate within the cup without translation, the cup member including a cup base and a cup cap,
wherein the cup base includes a first spherical surface and interior threads, and the cup cap includes a second spherical surface and exterior threads adapted to mate with the interior threads of the cup base, with the first and second spherical surfaces being adapted to cooperate to hold the stud ball therebetween when the cup cap is threaded into the cup base;
wherein the cup base includes upwardly-extending castle teeth; and
iii) one or more threaded fasteners adapted to interlock with the castle teeth to prevent the cup cap from unthreading from the cup base, and thus to lock the ball into position in the socket;

b) tightening the cup base and the cup cap around the stud ball to secure the ball in the cup in a manner effective to allow the ball to move rotationally in the cup but not to move translationally, and locking the cup cap in position by tightening the set screws to block the castle teeth from rotational movement;

c) attaching the stud and the cup to separate vehicle members and operating the vehicle until the connection between the ball and the cup has loosened enough to allow translational movement of the ball in the cup;

d) loosening the set screws to unblock the castle teeth from rotational movement, and subsequently retightening the cup base and the cup cap around the stud ball to resecure the ball in the cup in a manner effective to allow the ball to move rotationally in the cup but not to move translationally, and subsequently relocking the cup cap in position by retightening the set screws to block the castle teeth from rotational movement.

In some embodiments the device includes boot retaining that is machined into the pin. One preferred structure for boot retaining is a lip on the stud shank that keeps the boot from slipping onto the smaller diameter "neck" area where the ball attaches to the stem. This is particularly useful when the joint is at full articulation. As shown in the drawings, the neck is smaller than the stem to allow more articulation in the joint, which is frequently advantageous on lifted ATV or UTV machines.

Figure 1B:
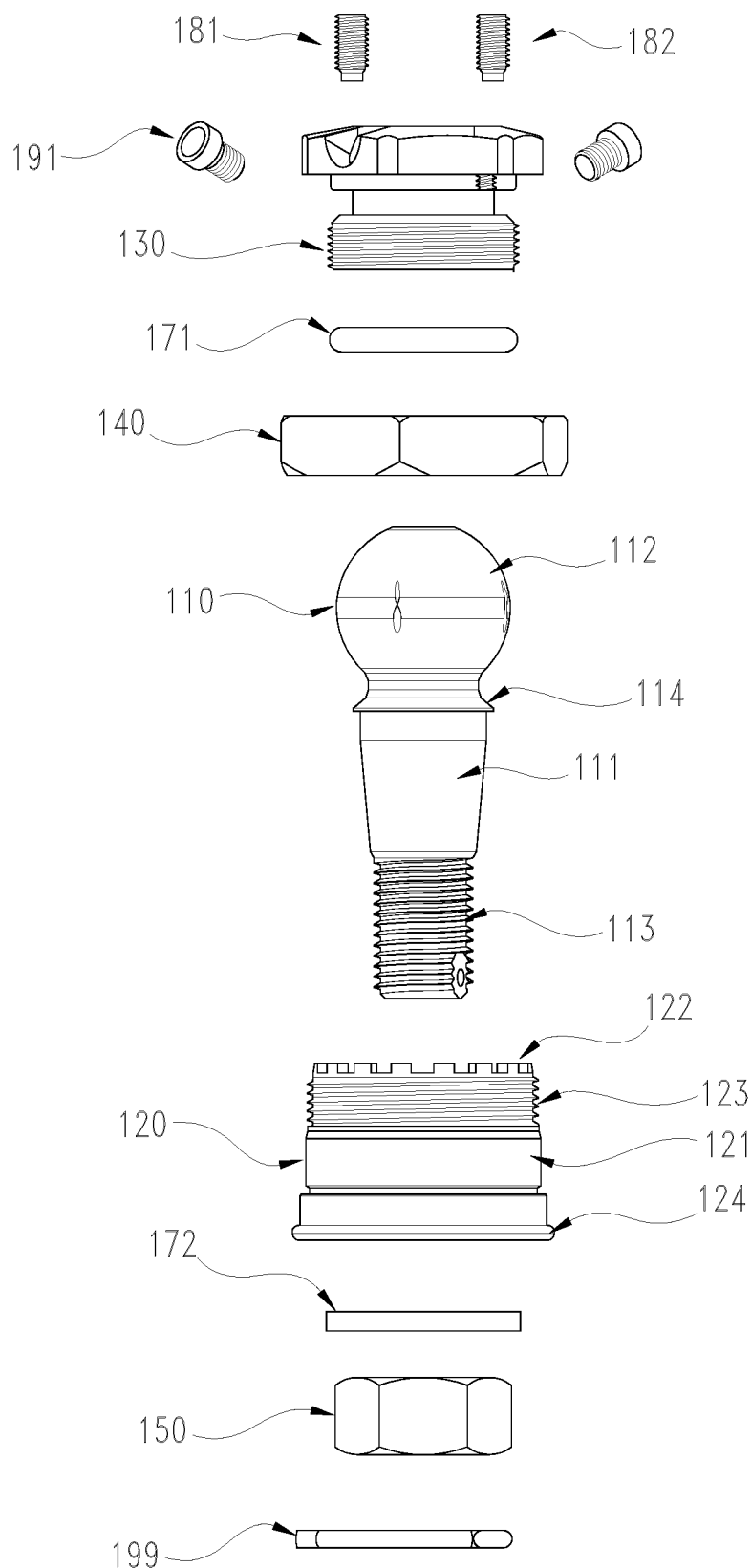

Referring now to the drawings, FIGS. 1A and 1B are exploded perspective views of one embodiment of the disclosed ball joint assembly. In FIG. 1A, the assembly includes set screws 181 and 182, grease Zerk 191, cup cap 130, o-ring 171, first nut 140, cup base 120, stud 110, washer 172, second nut 150, and pin 199. Cup base 120 includes cup lip 124, base wall 121, and the exterior threaded surface 123 of base wall 121. The end of base wall 121 that is directed toward cup cap 130 in this exploded view includes castle teeth 122, and the end of base wall 121 that is directed away from cup cap 130 in this exploded view includes cup lip 124, as illustrated. Stud 110 includes shank portion 111 and ball portion 112. Shank portion 111 includes threads 113 at one end, and a boot-retaining lip 114 at or near the other end. A neck portion separates ball 112 from shank 111 in the illustrated embodiment.

Figure 2:
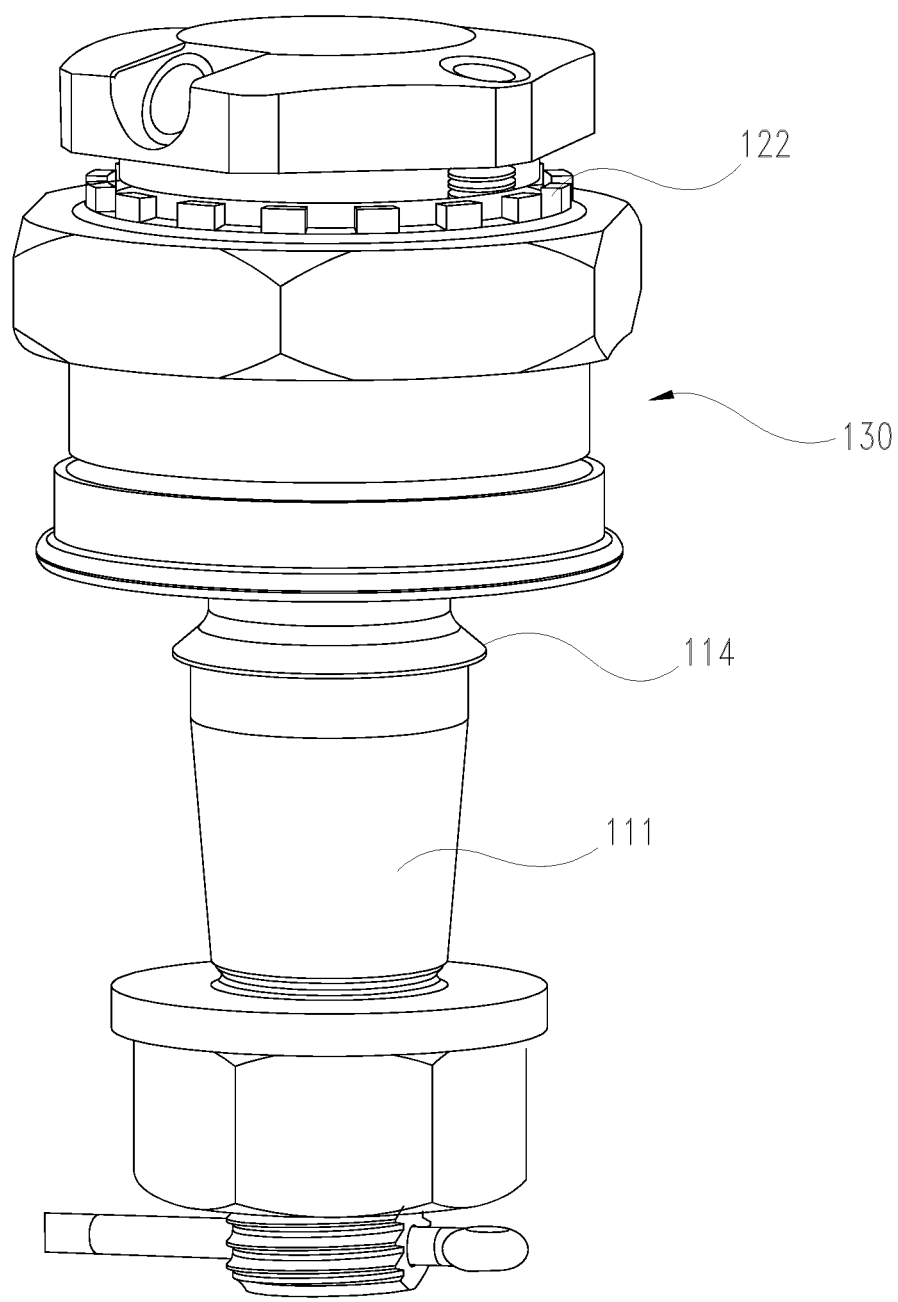
FIG. 2 is a perspective view of one embodiment of the ball joint assembly of the present invention.

FIG. 2 is a perspective view of one embodiment of the disclosed ball joint assembly, particularly showing stud 111 and boot retaining lip 114. Cup cap 130 through which castle teeth 122 protrude is also illustrated.

Figure 3A:
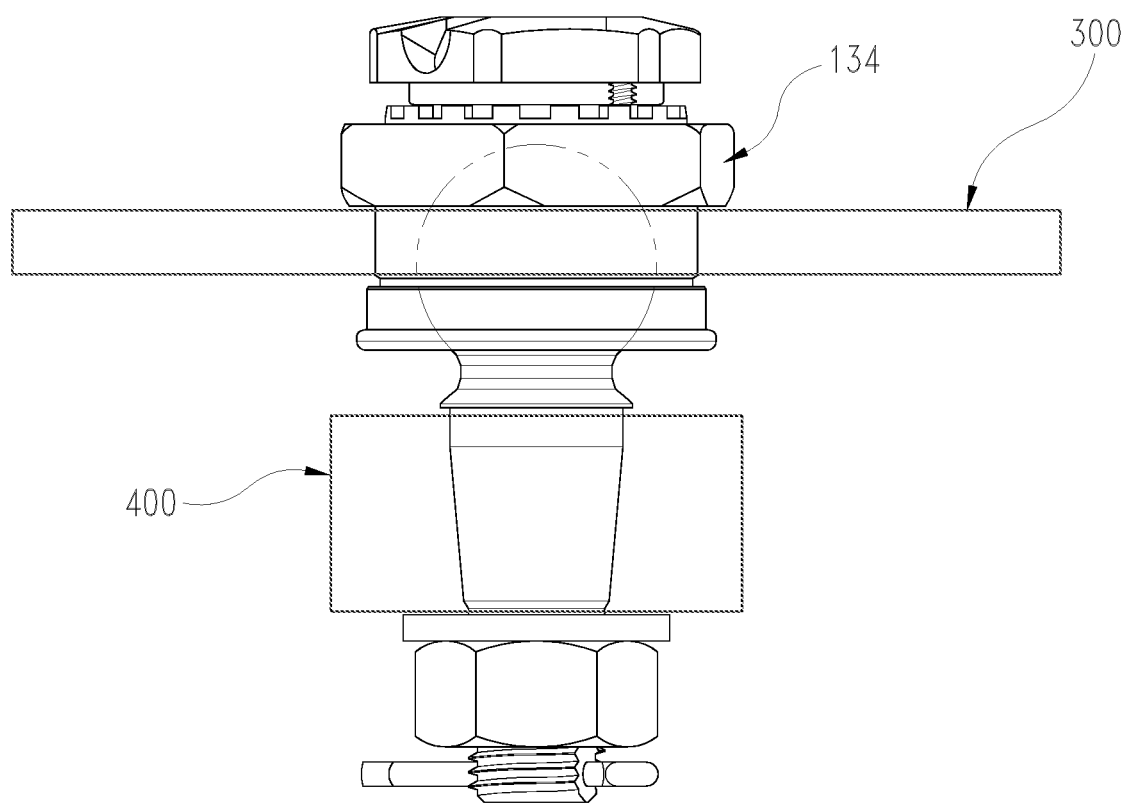
FIGS. 3A and 3B shows embodiments of the ball joint assembly of the present invention as it may be attached to vehicle suspension components.
Figure 3B:
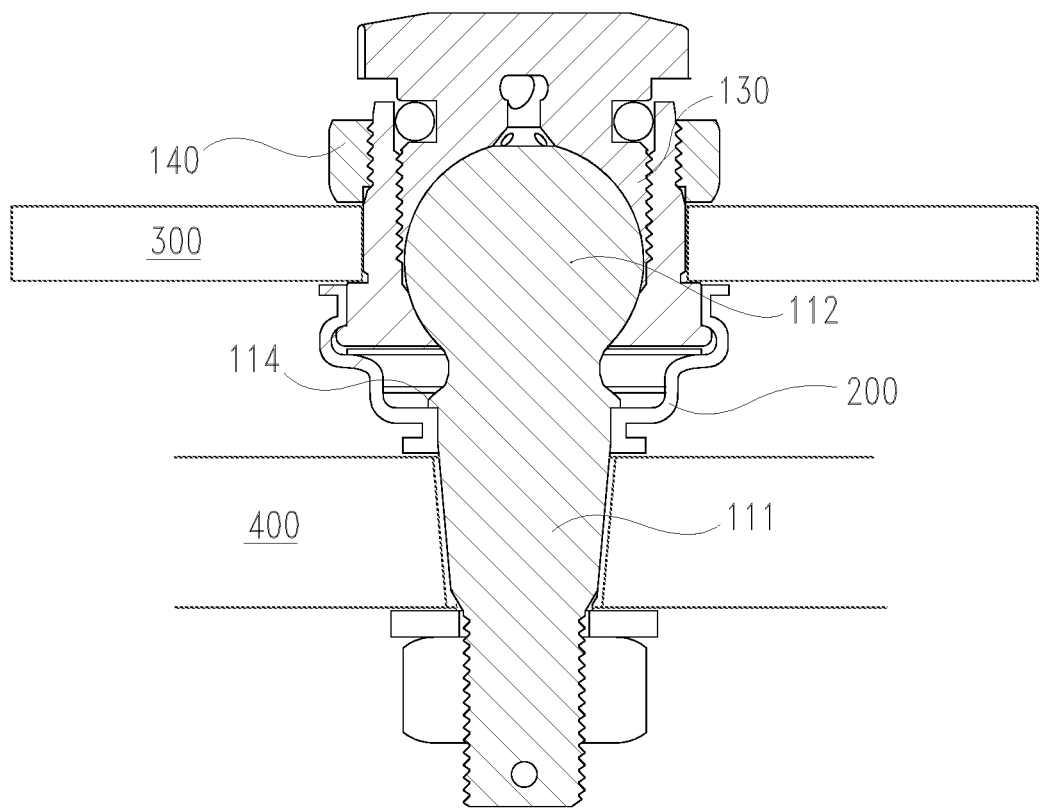

FIGS. 3A and 3B show embodiments of a ball joint assembly according to one aspect of the present invention as it may be attached to vehicle suspension components. In FIG. 3A, cup cap 130 includes cap top 134 which abuts castle teeth 122 of cup base 120 so that set screws may to interlock with the castle teeth to allow adjustment of the tightness of the ball and cup and to lock the ball into position in the cup. A vehicle's first structural component 300 (such as an A-arm) is connected to the vehicle second structural component 400 (such as a spindle or portal box) using the illustrated assembly. In the illustrated embodiment, nut 140 and cup base 120 secure the ball portion of the joint to the first vehicle suspension component, with the two halves 120 and 130 of the cup member substantially enclosing and holding ball 112. Simultaneously, washer 172 (held by nut 150) secure the stud portion of the joint to the second vehicle suspension component.

Figure 4:
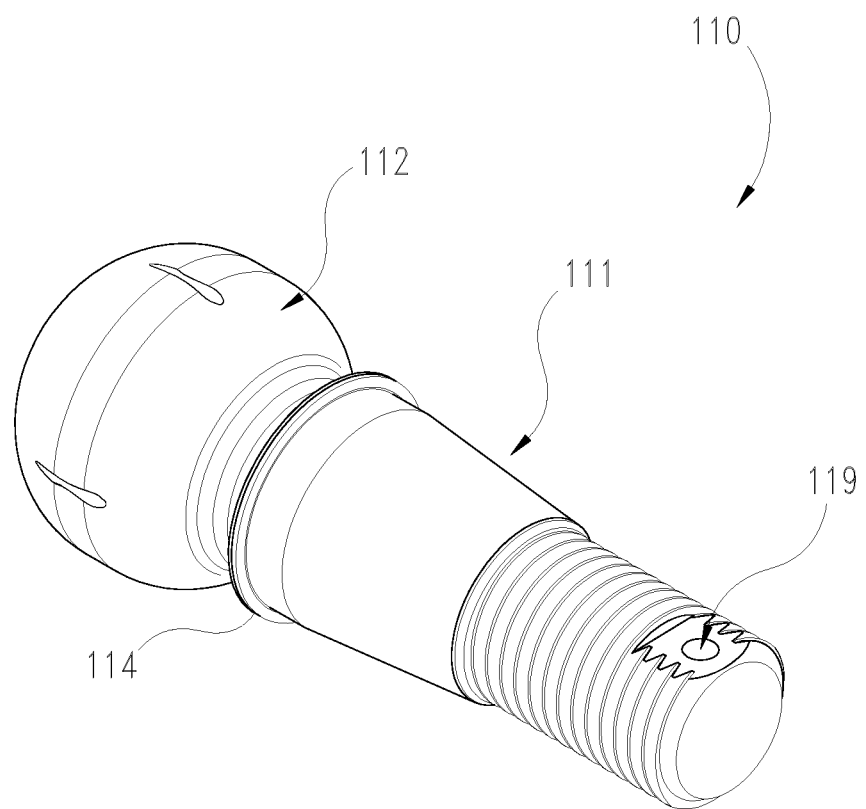
FIG. 4 shows one embodiment of the stud member of the ball joint assembly of the present invention.

FIG. 4 shows one embodiment of the a stud member that may be used in one embodiment of the disclosed ball joint assembly. Stud 110 includes shank 111 and ball 114, with lip 114 and a hole 119 for pin 188 also being illustrated.

Figure 5:
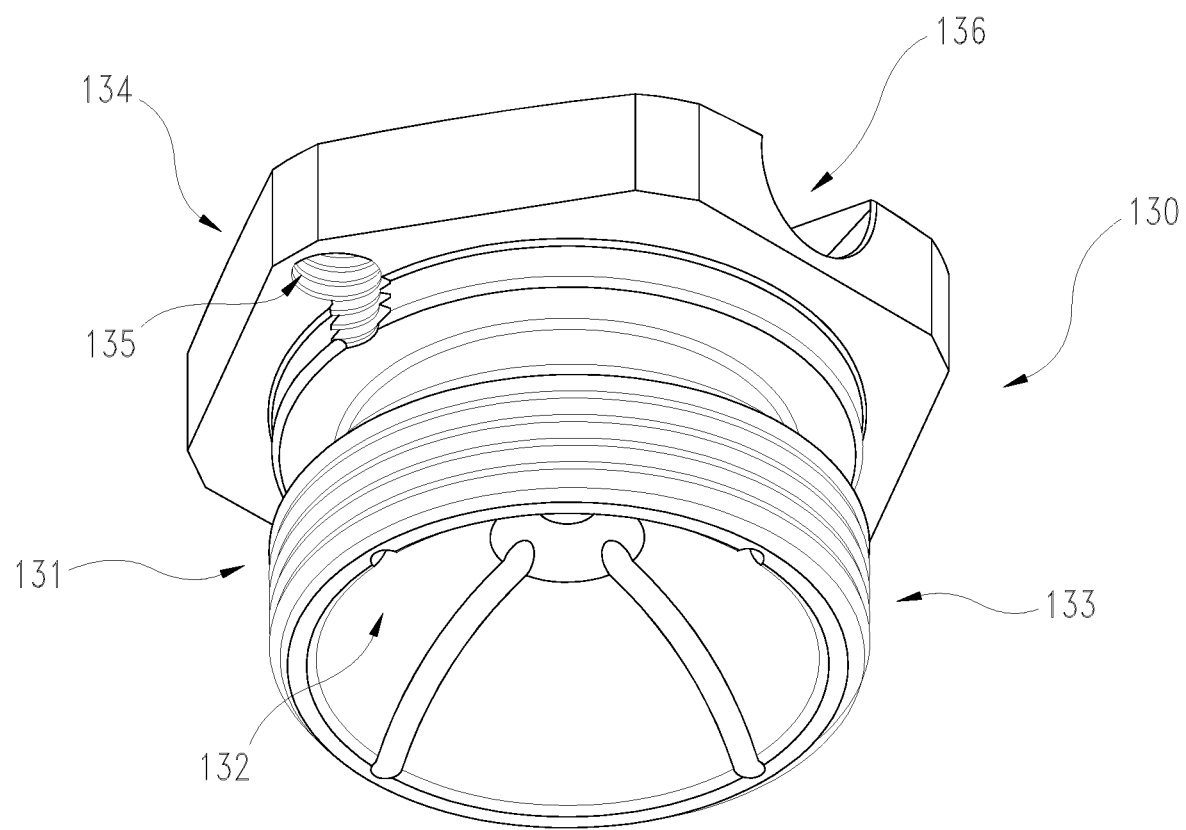
FIG. 5 is a perspective view of one embodiment of the cup cap of the ball joint assembly of the present invention.

FIG. 5 is a perspective view of one embodiment of the cup cap that may be used in one embodiment of the disclosed ball joint assembly. Cup cap 130 includes cup wall 131 having a curved interior surface 132 that substantially matches and is adapted to receive stud ball 112. Exterior threads 133 on cup wall 131 allow cup cap 130 to be threaded into cup base 120, and this to hold stud ball 112 therebetween. Cup cap 130 includes a top 134 with holes 135 for receiving set screws, and with an opening 136 for one or more grease Zerks.

Figure 6:
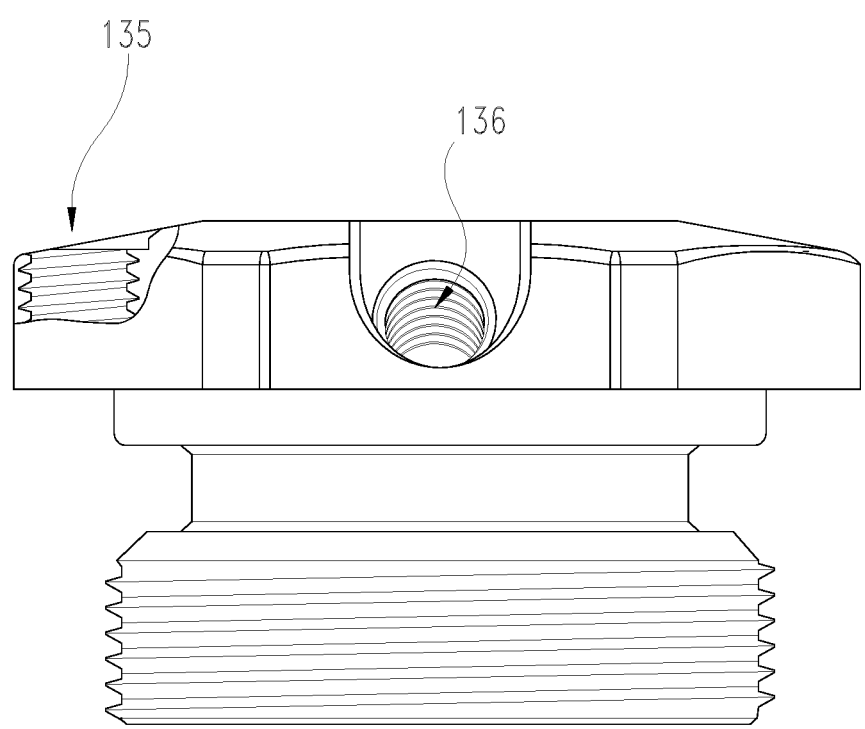
FIG. 6 is a side elevational view, in partial section, of one embodiment of the cup cap of the ball joint assembly of the present invention.

FIG. 6 is a side elevational view, in partial section, of one embodiment of the cup cap of the disclosed ball joint assembly. Hole 135 for receiving a set screw, and opening 136 for a grease Zerk, are illustrated.

Figure 7:
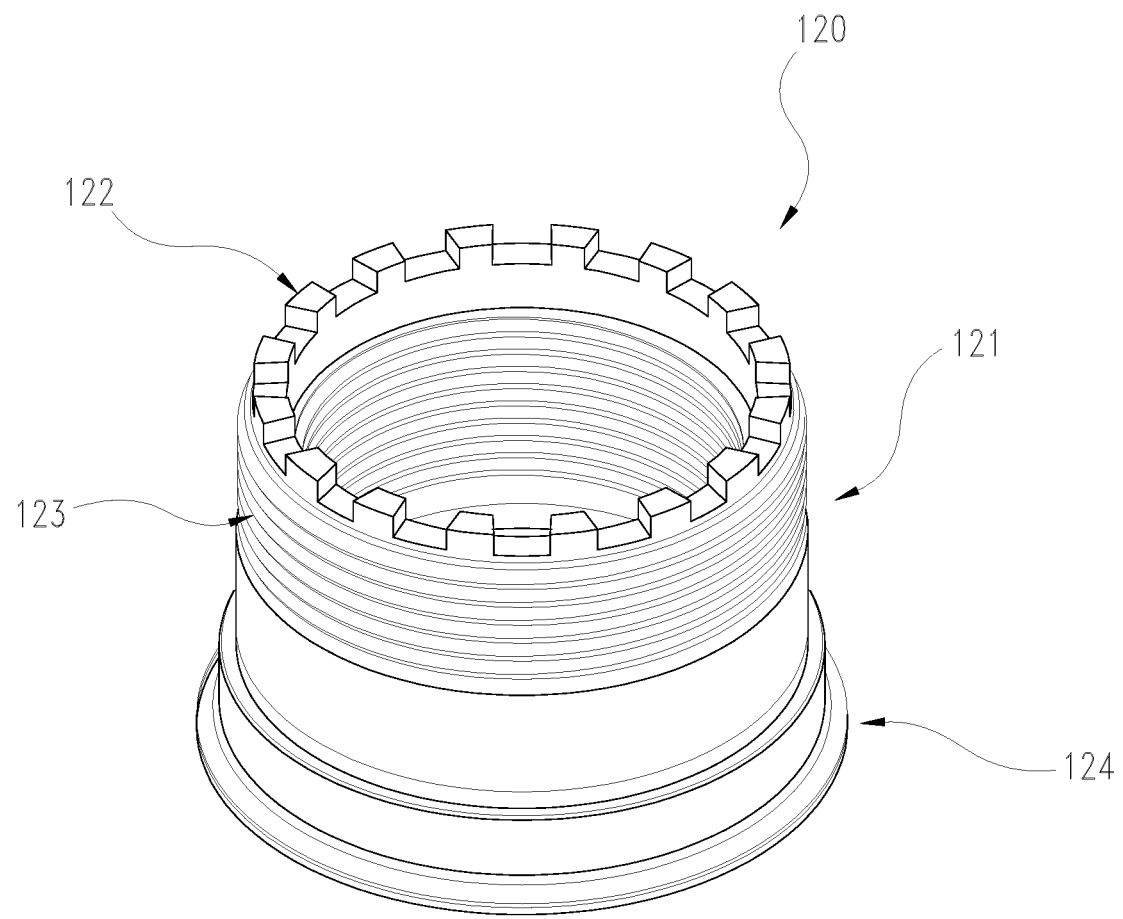
FIG. 7 is a perspective view of one embodiment of the cup base of the ball joint assembly of the present invention.

FIG. 7 is a perspective view of one embodiment of a cup base that may be used in one embodiment of the disclosed ball joint assembly. Cup base 120 includes a base wall 121, which includes exterior threads 123 on the outside, and a curved inner surface 125 on the inside. Like the curved inner surface 132 of cup cap 130, the curved inner surface 125 or cup base 120 substantially matches and is adapted to receive stud ball 112. Accordingly, the two halves 120 and 130 of the cup member substantially enclose and hold ball 112.

Figure 8:
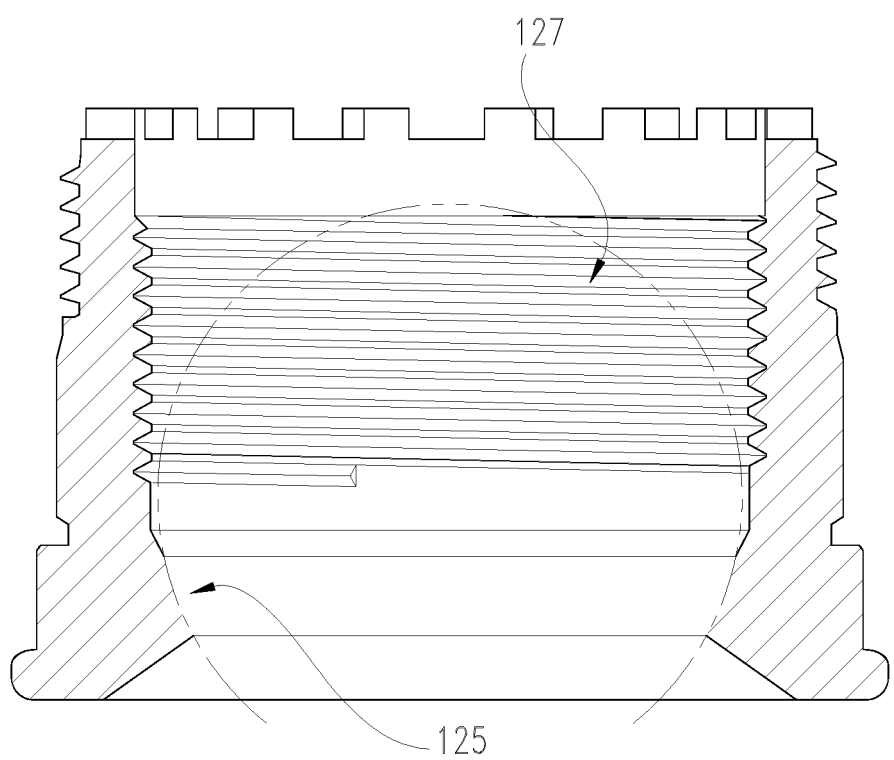
FIG. 8 is a side elevational view, in full section, of one embodiment of the cup base of the ball joint assembly of the present invention, holding a stud ball member shown in phantom.

FIG. 8 is a side elevational view, in full section, of the cup base 120 of one embodiment of the disclosed ball joint assembly. Curved inner surface 125 of base wall 121 is illustrated, as is the threaded exterior surface of that wall. As previously described, interior threads 127 of cup base 120 cooperate with exterior threads 131 of the cup cap to hold those two pieces together. Stud ball 112 is illustrated in phantom in the cup.

Figure 9:
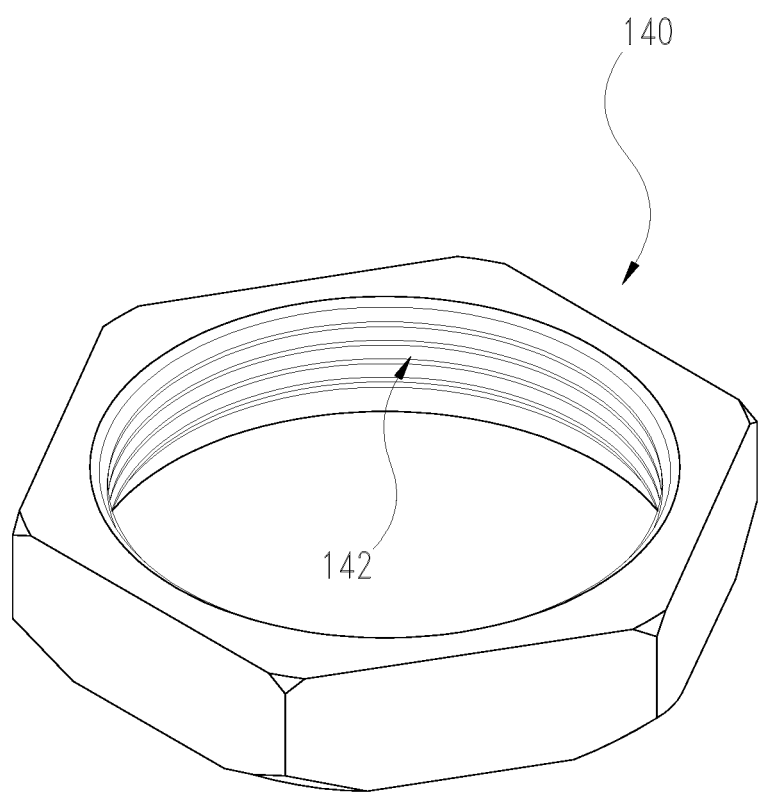
FIG. 9 is a perspective view of one embodiment of the first nut of the ball joint assembly of the present invention.

FIG. 9 is a perspective view of one embodiment of a nut 140 that may be used in one embodiment of the disclosed ball joint assembly. Inner threads 142 are illustrated, and are preferably used to secure the assembly to a vehicle structural component.

Figure 10:
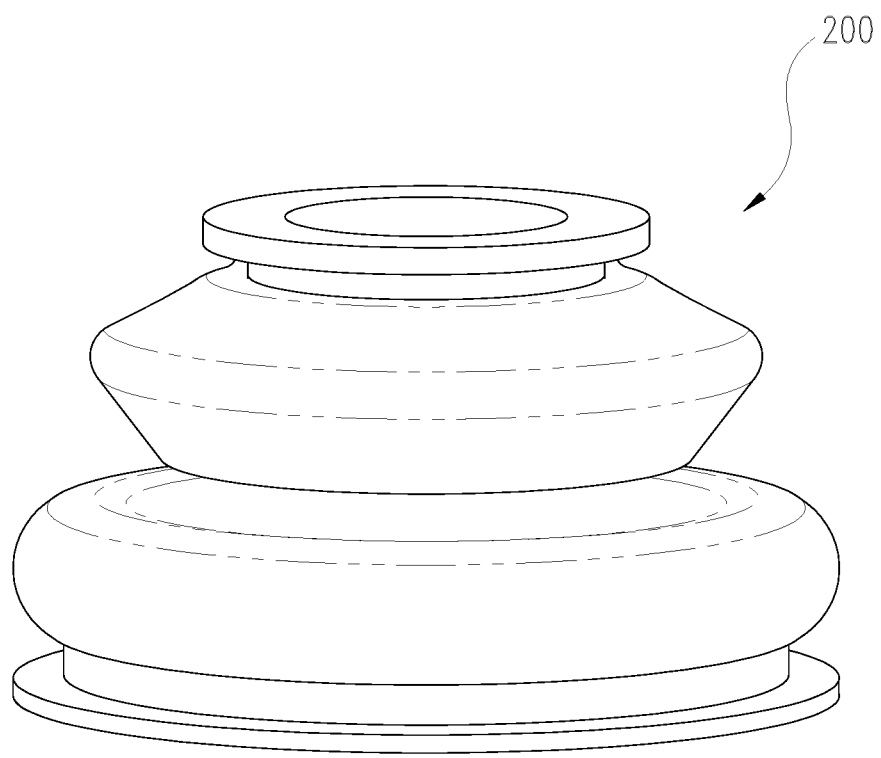
FIG. 10 is a perspective view of one embodiment of a boot that may be used to cover and protect the ball joint assembly of the present invention.

FIG. 10 is a perspective view of one embodiment of a protective boot that may be used to cover and protect the ball joint assembly of the present invention.

Figure 11:
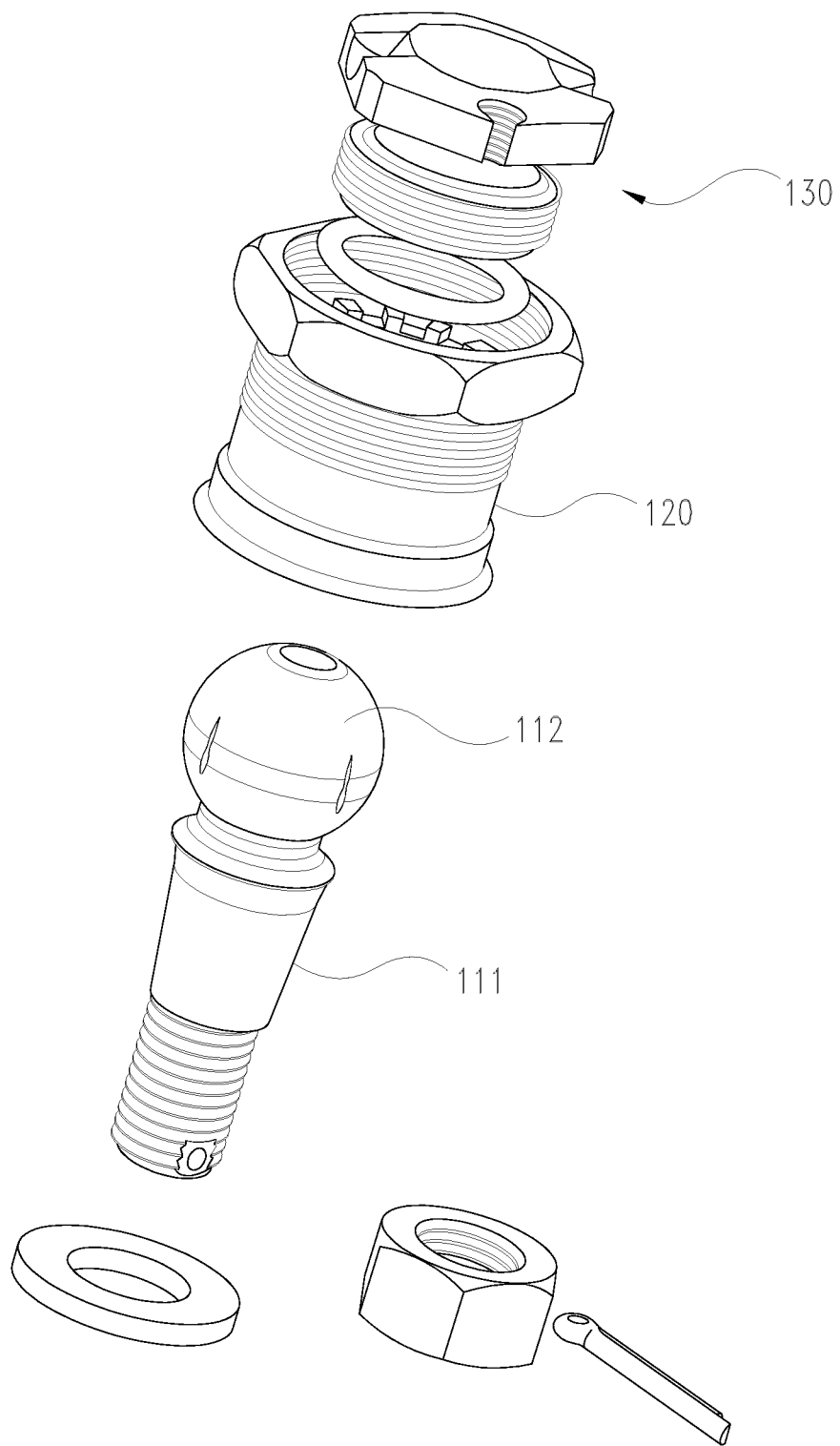
FIG. 11 is a perspective view of components used in one embodiment of the ball joint assembly of the present invention.

FIG. 11 is a perspective view of components used in one embodiment of the disclosed ball joint assembly. Cup cap 130 and cup base 120 cooperate to hold stud ball 112 therebetween. Stud shank 110 extends to connect to a vehicle suspension component.

Figure 12:
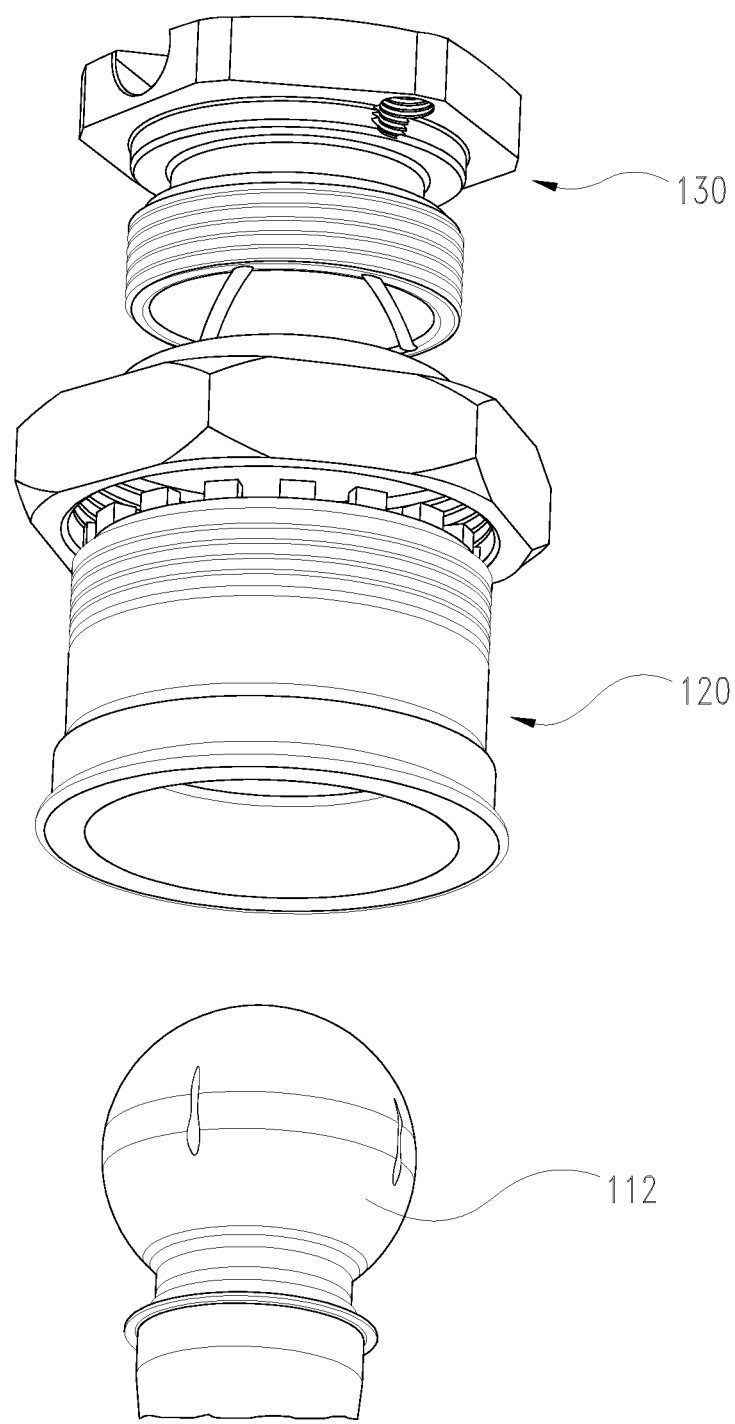
FIG. 12 is a perspective view of components used in one embodiment of the ball joint assembly of the present invention.

FIG. 12 is a perspective view of components used in one embodiment of the disclosed ball joint assembly. Cup cap 130 and cup base 120 cooperate to hold stud ball 112 therebetween.

Figure 13:
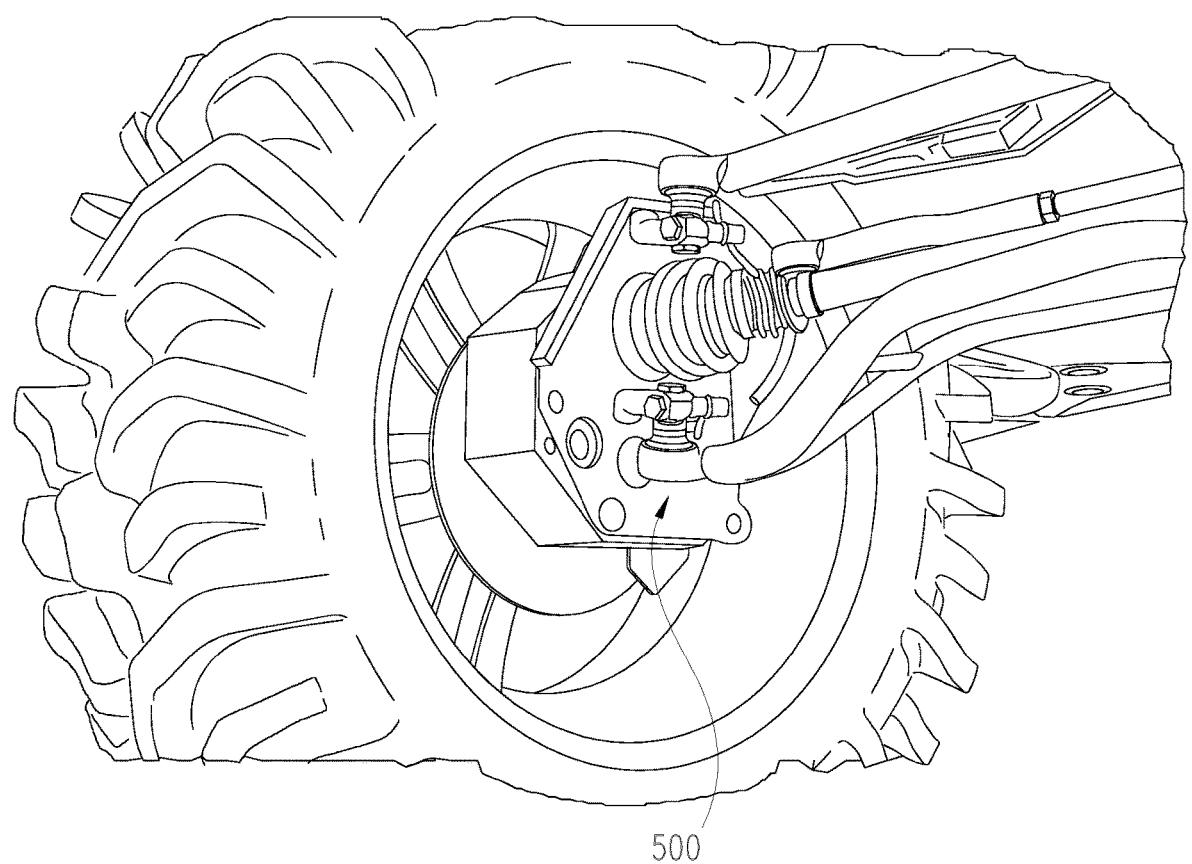
FIG. 13 shows one embodiment of the ball joint assembly of the present invention used to connect upper A-arm of a vehicle to a portal box, and used to connect lower A-arm of a vehicle to that same portal box.

FIG. 13 shows one embodiment of the disclosed ball joint assembly used to connect upper A-arm of a vehicle to a portal box, and used to connect lower A-arm of a vehicle to that same portal box.

The detailed description and drawings are considered as illustrative and not restrictive; it being understood that only certain embodiments have been shown and described and that all changes and modifications that come within the spirit of the invention are desired to be protected. In addition, it is to be appreciated that the described embodiments may comprise or consist essentially of any or all of the described or illustrated elements and/or features. For example, the present invention includes devices and methods comprising any or all of the elements and/or features described or illustrated in specification or drawings, and the present invention includes devices and methods consisting essentially of any or all of the elements and/or features illustrated in the specification or drawings. Additionally, any or all of the elements and/or features and/or embodiments disclosed herein may be combined with any or all of the other elements and/or features and/or embodiments disclosed herein to provide a device or method that comprises or consists essentially of such elements and/or features.

For clarity, when the grammatical device "and/or" (such as in "A and/or B") is used in this disclosure, it is intended to mean A alone, or B alone, or both A and B.

The invention claimed is:

1. A ball joint assembly, comprising:
   a) a stud member connectable to a first vehicle suspension component and comprising: i) a shaft portion defining a longitudinal axis, and ii) a ball portion extending longitudinally from one end of the stud;
   b) a cup member connectable to a second vehicle suspension component and adapted to cooperate with the stud member to allow the stud ball to rotate within the cup without translation, the cup member including a cup base and a cup cap,
   wherein the cup base includes a first spherical surface and interior threads, and the cup cap includes a second spherical surface and exterior threads adapted to mate with the interior threads of the cup base, with the first and second spherical surfaces being adapted to cooperate to hold the stud ball therebetween when the cup cap is threaded into the cup base;
   wherein the cup base includes upwardly-extending castle teeth;
   c) one or more threaded fasteners adapted to interlock with the castle teeth to prevent the cup cap from unthreading from the cup base, and thus to lock the ball into position in the cup.

2. The assembly of claim 1 wherein the cup cap includes threaded holes adapted to receive the threaded fasteners and thus to facilitate using the threaded fasteners to interlock with the castle teeth to allow adjustment of the tightness of the ball and cup and to lock the ball into position in the cup.

3. The assembly of claim 1 wherein the assembly includes a first nut and the cup base includes a surface adapted to cooperate with the first nut to secure the cup portions of the assembly to a vehicle suspension component.

4. The assembly of claim 3 wherein a socket cup includes a set of exterior threads adapted to cooperate with the first nut to allow the assembly to be attached to a vehicle suspension component.

5. The assembly of claim 1 wherein the assembly includes a second nut to secure the shank portion of the assembly to a vehicle suspension component therebetween.

6. The assembly of claim 1 wherein a socket cup includes a set of interior threads and a socket cap includes a set of exterior threads adapted to cooperate with the interior threads of the socket cup to hold those two pieces together.

7. The assembly of claim 1 wherein the assembly includes a boot adapted to substantially cover and protect the assembly.

8. The assembly of claim 1 wherein the threaded fasteners comprise one or more set screws.

9. The assembly of claim 1 wherein the stud has a tapered shaft and a boot-retaining lip adapted to prevent the boot from slipping onto a smaller diameter "neck" area where the ball attaches to the stem.

10. A method of maintaining a ball joint on a vehicle, the method comprising:
   a) providing a ball joint comprising:
      i) A stud member connectable to a first vehicle suspension component and comprising: a) a shaft portion defining a longitudinal axis, and b) a ball portion extending longitudinally from one end of the stud;
      ii) a cup member connectable to a second vehicle suspension component and adapted to cooperate with the stud member to allow the stud ball to rotate within the cup without translation, the cup member including a cup base and a cup cap,
      wherein the cup base includes a first spherical surface and interior threads, and the cup cap includes a second spherical surface and exterior threads adapted to mate with the interior threads of the cup base, with the first and second spherical surfaces being adapted to cooperate to hold the stud ball therebetween when the cup cap is threaded into the cup base;
      wherein the cup base includes upwardly-extending castle teeth; and
         iii) one or more threaded fasteners adapted to interlock with the castle teeth to prevent the cup cap from unthreading from the cup base, and thus to lock the ball into position in the socket;
   b) tightening the cup base and the cup cap around the stud ball to secure the ball in the cup in a manner effective to allow the ball to move rotationally in the cup but not to move translationally, and locking the cup cap in position by tightening the set screws to block the castle teeth from rotational movement;
   c) attaching the stud and the cup to separate vehicle members and operating the vehicle until the connection between the ball and the cup has loosened enough to allow translational movement of the ball in the cup;
   d) loosening the set screws to unblock the castle teeth from rotational movement, and subsequently retightening the cup base and the cup cap around the stud ball to resecure the ball in the cup in a manner effective to allow the ball to move rotationally in the cup but not to move translationally, and subsequently relocking the cup cap in position by retightening the set screws to block the castle teeth from rotational movement.

\* \* \* \* \*